(12) United States Patent
Dai et al.

(10) Patent No.: US 11,586,308 B2
(45) Date of Patent: Feb. 21, 2023

(54) TOUCH DISPLAY AND ANTI-INTERFERENCE METHOD THEREOF

(71) Applicant: SHENZHEN CHINA STAR OPTOELECTRONICS SEMICONDUCTOR DISPLAY TECHNOLOGY CO., LTD., Shenzhen (CN)

(72) Inventors: Aimin Dai, Shenzhen (CN); Hao Zhao, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 427 days.

(21) Appl. No.: 16/758,415

(22) PCT Filed: Apr. 21, 2020

(86) PCT No.: PCT/CN2020/085871
§ 371 (c)(1),
(2) Date: Apr. 23, 2020

(87) PCT Pub. No.: WO2021/208118
PCT Pub. Date: Oct. 21, 2021

(65) Prior Publication Data
US 2022/0317792 A1  Oct. 6, 2022

(30) Foreign Application Priority Data
Apr. 13, 2020 (CN) .......................... 202010284524.3

(51) Int. Cl.
G06F 3/041 (2006.01)
G06F 3/044 (2006.01)
G06F 3/045 (2006.01)

(52) U.S. Cl.
CPC ............ *G06F 3/0412* (2013.01); *G06F 3/045* (2013.01); *G06F 3/0418* (2013.01); *G06F 3/0445* (2019.05)

(58) Field of Classification Search
CPC .... G06F 3/0412; G06F 3/0445; G06F 3/0418; G06F 3/045
See application file for complete search history.

(56) References Cited

U.S. PATENT DOCUMENTS 9,665,220 B2  5/2017  Park
9,730,367 B1  8/2017  Zhang et al.
(Continued)

FOREIGN PATENT DOCUMENTS

CN  103135815 A  6/2013
CN  103197812 A  7/2013
(Continued)

*Primary Examiner* — Deeprose Subedi
(74) *Attorney, Agent, or Firm* — PV IP PC; Wei Te Chung; Ude Lu

(57) ABSTRACT

A touch display and an anti-interference method thereof are provided. The touch display has a display panel, a touch panel, a touch chip, and a compensation circuit. A compensation signal line is led out from a common electrode layer of the display panel. A sensing signal line is led out from a touch layer of the touch panel. An input terminal of the compensation circuit is connected to the compensation signal line and the sensing signal line, and a compensated sensing signal is output to the touch chip from the output terminal. An ability of the touch screen to resist noise interference is improved.

18 Claims, 3 Drawing Sheets

(56) References Cited

U.S. PATENT DOCUMENTS

| | | | |
|---|---|---|---|
| 2013/0335342 A1* | 12/2013 | Kim | ............... G06F 3/0443 |
| | | | 345/173 |
| 2014/0333582 A1 | 11/2014 | Huo | |
| 2016/0378233 A1 | 12/2016 | Huo | |
| 2019/0227649 A1 | 7/2019 | Micci et al. | |
| 2019/0377468 A1 | 12/2019 | Micci et al. | |
| 2019/0377469 A1 | 12/2019 | Routley et al. | |
| 2020/0026383 A1* | 1/2020 | Hwang | ............ G06F 3/04184 |

FOREIGN PATENT DOCUMENTS

| | | |
|---|---|---|
| CN | 104281352 A | 1/2015 |
| CN | 104730747 A | 6/2015 |
| CN | 106354327 A | 1/2017 |
| CN | 110568952 A | 12/2019 |

\* cited by examiner

TOUCH DISPLAY AND ANTI-INTERFERENCE METHOD THEREOF

FIELD OF DISCLOSURE

The present application relates to displays, and more particularly to a touch display and an anti-interference method thereof.

BACKGROUND OF DISCLOSURE

With a continuous development of capacitive touch screens towards thinner, larger size, and higher precision, an appearance of in-cell touch screens has greatly reduced thickness of display screens. The liquid crystal display 900 shown in FIG. 1 adopts an in-cell touch screen, including a lower polarizer 91, an array substrate 92, a liquid crystal layer 93, a color filter substrate 94, and an upper polarizer 95. The color filter substrate 94 includes a glass substrate 941, a touch layer 942, a color filter layer 943, and a common electrode layer 944. The touch layer 942 is directly fabricated on the color filter substrate 94 in the liquid crystal display 900. However, a distance between the touch layer 942 and a driving component (such as the common electrode layer 944) in the liquid crystal display 900 is very small, which will cause a relatively tight coupling between both. As shown in a basic structure diagram of a conventional touch display shown in FIG. 2, a data line (Data) and a gate line (Gate) on the array substrate, while controlling the thin film transistor T1 to supply voltage to the pixel electrode 921, will affect the common electrode layer 944 on the color filter substrate, so as to cause the common electrode layer 944 to generate unavoidable voltage fluctuations. The touch layer 942 is very close to the common electrode layer 944, and both of which form a parasitic capacitance Cnoi. Therefore, voltage after the common electrode layer 944 is interfered is coupled to the touch layer 942 through a parasitic capacitance, so that a sensing signal RX that the touch layer 942 feeds back to a touch chip 800 is distorted, reducing a signal-to-noise ratio of the touch screen, which is likely to occur a problem of a burst point error. In industrues, a shielding layer is usually added between the touch layer and the driving layer of the liquid crystal panel to isolate a noise interference of the driving layer of the liquid crystal display on a signal of the touch layer. However, adding a shielding layer will not only reduce a penetration rate of the panel, but at the same time, due to presence of a grid of the shielding layer, a moire pattern is likely to occur, which affects a display effect.

Therefore, problems that the existing in-cell touch screen is seriously interfered by noise need to be solved.

SUMMARY OF DISCLOSURE

The present application provides a touch display and an anti-interference method thereof to alleviate technical problems of the existing in-cell touch screen being seriously interfered by noise.

To solve the above problems, the technical solutions provided by this application are as follows:

An embodiment of the present application provides a touch display comprising a display panel; a touch panel disposed on the display panel; a touch chip; and a compensation circuit, wherein: the display panel comprises a common electrode layer, and the common electrode layer leads to at least one compensation signal line. The touch panel comprises a touch layer disposed above the common electrode layer, and the touch layer leads to at least one sensing signal line. The touch chip is electrically connected to the touch layer. The compensation circuit comprises an input terminal and an output terminal, wherein the input terminal is connected to the compensation signal line and the sensing signal line, and the output terminal is connected to the touch chip. The compensation signal line provides a compensation signal to the compensation circuit, the sensing signal line provides a sensing signal to the compensation circuit, and the compensation circuit is used to output a compensated sensing signal to the touch chip.

In a touch display provided by an embodiment of the present application, the compensation circuit comprises a capacitor, a first resistor, an operational amplifier, a second resistor, and a third resistor. A first electrode plate of the capacitor is connected to the compensation signal line. One end of the first resistor is connected to a second electrode plate of the capacitor. An inverting input terminal of the operational amplifier is connected to another end of the first resistor, and an output terminal of the operational amplifier is connected to the touch chip. One end of the second resistor is connected to the sensing signal line. Another end of the second resistor is connected to a non-inverting input terminal of the operational amplifier. One end of the third resistor is connected to the inverting input terminal of the operational amplifier and another end of the first resistor, and another end of the third resistor is connected to the output terminal of the operational amplifier. The first resistor and the second resistor are fixed value resistors, and the third resistor is an adjustable resistor.

In a touch display provided by an embodiment of the present application, the compensation circuit further comprises a fourth resistor, wherein the fourth resistor is a balanced resistor disposed between the second resistor and the operational amplifier.

In a touch display provided by an embodiment of the present application, the compensation signal comprises a reference voltage signal and a fluctuating voltage signal, and the capacitor is used to filter out the reference voltage signal.

In a touch display provided by an embodiment of the present application, the display panel further comprises: a first substrate; a second substrate disposed opposite to the first substrate; and a printed circuit board electrically connected to the first substrate, wherein the touch chip is disposed on the printed circuit board, and wherein the common electrode layer and the touch layer are both disposed on the second substrate.

In a touch display provided by an embodiment of the present application, the printed circuit board is connected to the first substrate through a chip-on-film.

In a touch display provided by an embodiment of the present application, the compensation circuit is disposed on the printed circuit board and located in a peripheral circuit of the touch chip.

In a touch display provided by an embodiment of the present application, a plurality of gold balls are also disposed on the second substrate, and the compensation signal line and the sensing signal line: are electrically connected respectively to the common electrode layer and the touch layer through the plurality of gold balls; extend to a wiring region of the first substrate, respectively; and connect to the compensation circuit through the chip-on-film.

In a touch display provided by an embodiment of the present application, the compensation circuit is integrated on the touch chip.

In a touch display provided by an embodiment of the present application, a plurality of gold balls are also disposed on the second substrate, and the compensation signal line and the sensing signal line: are electrically connected respectively to the common electrode layer and the touch layer through the plurality of gold balls; extend to a wiring region of the first substrate, respectively; and connect to the touch chip through the chip-on-film.

An embodiment of the present application provides an anti-interference method of a touch display. The touch display comprises: a display panel; a touch panel disposed on the display panel; a touch chip; and a compensation circuit, wherein the display panel comprises a common electrode layer; the touch panel comprises a touch layer disposed above the common electrode layer, and the touch layer is electrically connected to the touch chip; and the compensation circuit comprises an input terminal and an output terminal, wherein the anti-interference method of the touch display comprises: leading out at least one compensation signal line from the common electrode layer, wherein the compensation signal line is connected to the input terminal of the compensation circuit to provide a compensation signal to the compensation circuit; leading out at least one sensing signal line from the touch layer, and the sensing signal line is connected to another input terminal of the compensation circuit to provide a sensing signal to the compensation circuit; and outputting, by the compensation circuit, a compensated sensing signal to the touch chip through the output terminal.

In an anti-interference method of a touch display provided by an embodiment of the present application, the compensation circuit comprises a capacitor, a first resistor, an operational amplifier, a second resistor, and a third resistor. A first electrode plate of the capacitor is connected to the compensation signal line. One end of the first resistor is connected to a second electrode plate of the capacitor. An inverting input terminal of the operational amplifier is connected to another end of the first resistor, and an output terminal of the operational amplifier is connected to the touch chip. One end of the second resistor is connected to the sensing signal line. Another end of the second resistor is connected to a non-inverting input terminal of the operational amplifier. One end of the third resistor is connected to the inverting input terminal of the operational amplifier and another end of the first resistor, and another end of the third resistor is connected to the output terminal of the operational amplifier. The first resistor and the second resistor are fixed value resistors, and the third resistor is an adjustable resistor.

In an anti-interference method of a touch display provided by an embodiment of the present application, the compensation circuit further comprises a fourth resistor, wherein the fourth resistor is a balanced resistor disposed between the second resistor and the operational amplifier.

In an anti-interference method of a touch display provided by an embodiment of the present application, the compensation signal comprises a reference voltage signal and a fluctuating voltage signal, and the capacitor is used to filter out the reference voltage signal.

In an anti-interference method of a touch display provided by an embodiment of the present application, the display panel further comprises: a first substrate; a second substrate disposed opposite to the first substrate; and a printed circuit board electrically connected to the first substrate, wherein the touch chip is disposed on the printed circuit board, and wherein the common electrode layer and the touch layer are both disposed on the second substrate.

In an anti-interference method of a touch display provided by an embodiment of the present application, the printed circuit board is connected to the first substrate through a chip-on-film.

In an anti-interference method of a touch display provided by an embodiment of the present application, the compensation circuit is disposed on the printed circuit board and located in a peripheral circuit of the touch chip.

In an anti-interference method of a touch display provided by an embodiment of the present application, a plurality of gold balls are also disposed on the second substrate, and the compensation signal line and the sensing signal line: are electrically connected respectively to the common electrode layer and the touch layer through the plurality of gold balls; extend to a wiring region of the first substrate, respectively; and connect to the compensation circuit through the chip-on-film.

In an anti-interference method of a touch display provided by an embodiment of the present application, the compensation circuit is integrated on the touch chip.

In an anti-interference method of a touch display provided by an embodiment of the present application, a plurality of gold balls are also disposed on the second substrate, and the compensation signal line and the sensing signal line: are electrically connected respectively to the common electrode layer and the touch layer through the plurality of gold balls; extend to a wiring region of the first substrate, respectively; and connect to the touch chip through the chip-on-film.

The beneficial effects of this application are that: in a touch display and an anti-interference method provided by the present application, before a sensing signal of the touch layer is transmitted to the touch chip, it is compensated by a compensation circuit. The compensation circuit can effectively filter out a part of the sensing signal interfered by a voltage fluctuation signal of the common electrode layer, retain a real touch sensing signal, and output a compensated sensing signal to the touch control chip. Problems that an existing in-cell touch screen is seriously interfered with by noise is solved, and an anti-interference ability of the touch screen is improved, thereby improving a signal-to-noise ratio of the touch screen.

DESCRIPTION OF DRAWINGS

In order to more clearly explain the embodiments or the technical solutions in the prior art, the following will briefly introduce the drawings required in the embodiments or the description of the prior art. Obviously, the drawings in the following description are just some embodiments of the disclosure. For a person of ordinary skill in the art, without paying any creative work, other drawings can also be obtained based on these drawings.

DETAILED DESCRIPTION OF PREFERRED EMBODIMENTS

Figure 1:
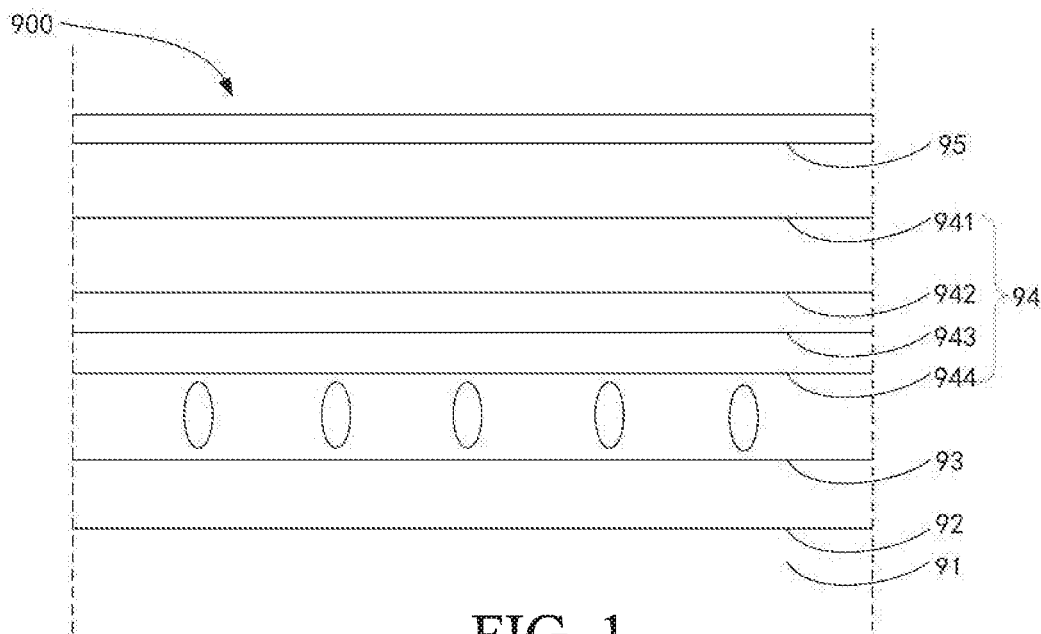
FIG. 1 is a schematic side view of a liquid crystal display using an in-cell touch screen in a conventional technology.
Figure 2:
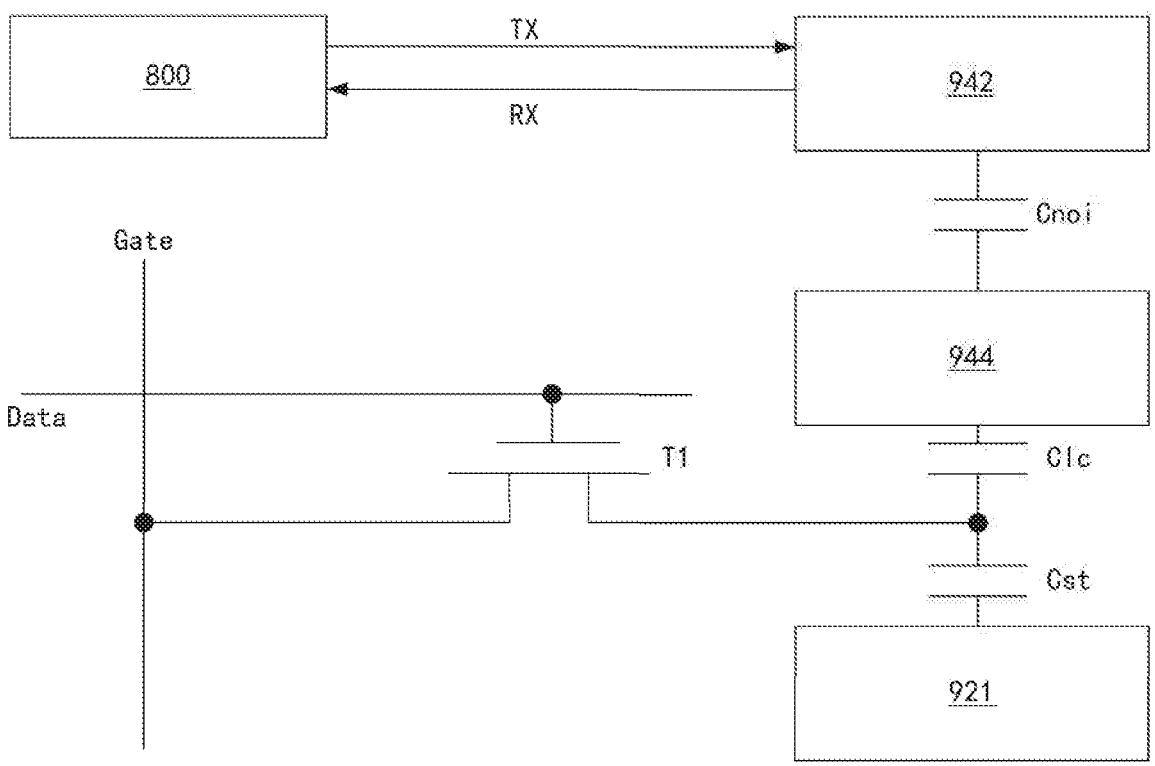
FIG. 2 is a schematic structural diagram of an in-cell touch screen in a conventional technology.

Descriptions of the following embodiments refer to additional drawings to illustrate specific embodiments that can be implemented in the present application. Directional terms mentioned in this application, such as [upper], [lower], [front], [back], [left], [right], [inner], [outer], [side], etc., refer to directions of the attached drawings. Therefore, the directional term used is to illustrate and understand this application, not to limit this application. In the figure, units with similar structures are indicated by the same reference numerals.

Figure 3:
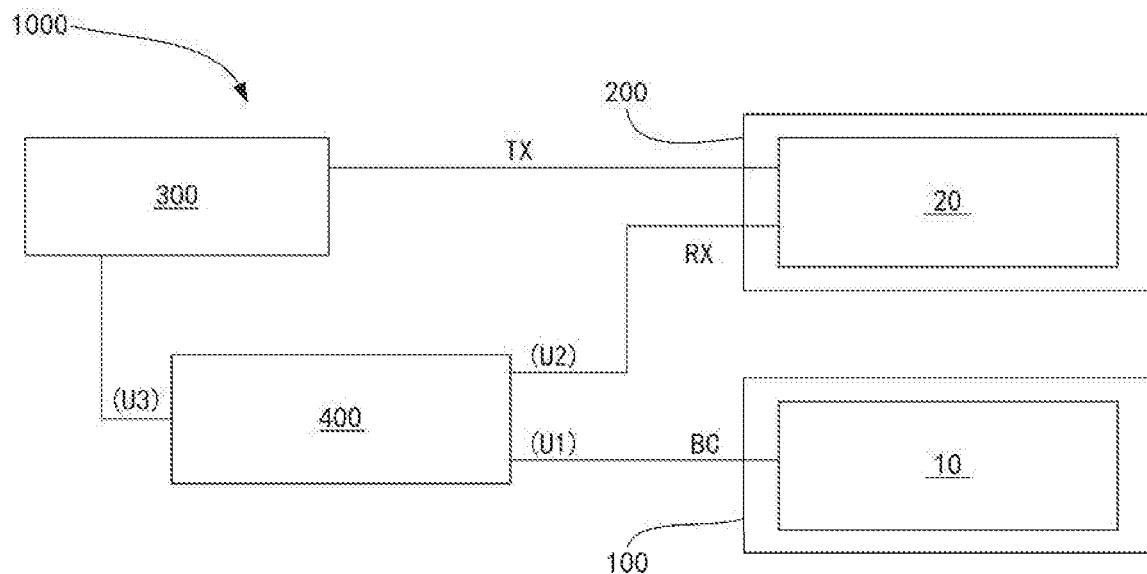
FIG. 3 is a schematic structural diagram of a touch display provided by an embodiment of the present application.

In an embodiment, as shown in FIG. 3, a touch display 1000 is provided and comprises: a display panel 100; a touch panel 200 disposed on the display panel 100; a touch chip 30; and a compensation circuit 400. The display panel 100 comprises a common electrode layer 10, and the common electrode layer 10 leads to at least one compensation signal line BC. The touch panel 200 comprises a touch layer 20 disposed above the common electrode layer 10, and the touch layer 20 leads to at least one sensing signal line RX. The touch chip 300 is electrically connected to the touch layer 20. The compensation circuit 400 comprises an input terminal and an output terminal, wherein the input terminal is connected to the compensation signal line BC and the sensing signal line RX, and the output terminal is connected to the touch chip 300. The compensation signal line BC provides a compensation signal U1 to the compensation circuit 400, the sensing signal line RX provides a sensing signal U2 to the compensation circuit 400, and the compensation circuit 400 is used to output a compensated sensing signal U3 to the touch chip 300.

Specifically, the touch chip 300 is electrically connected to the touch layer 20, including that: the touch chip 300 provides a driving signal to the touch layer 20 through a driving signal line TX, and the touch layer 20 feeds back a touch sensing signal to the touch chip 300.

Figure 4:
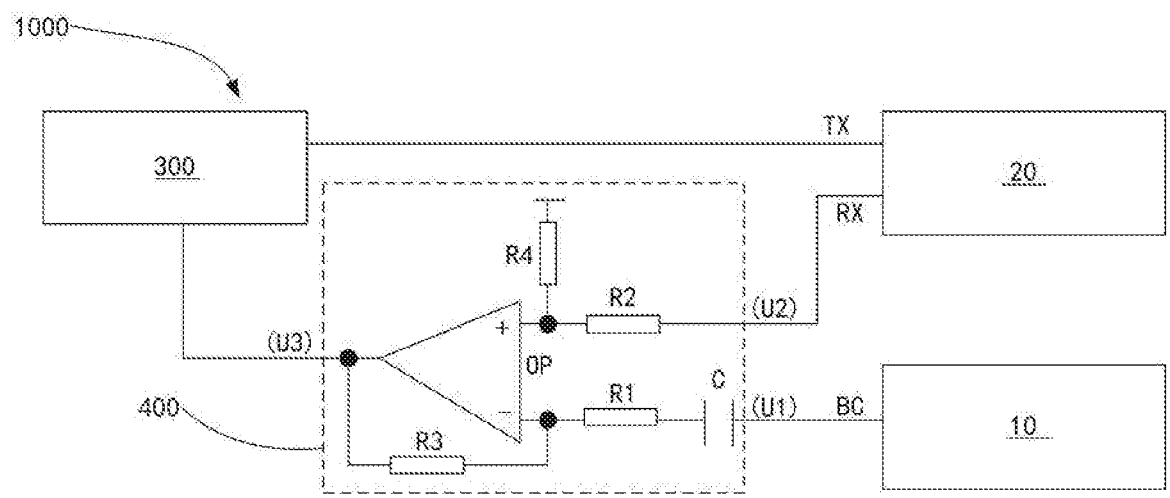
FIG. 4 is a schematic diagram of a compensation circuit in a touch display provided by an embodiment of the present application.

Specifically, as shown in FIG. 4, the compensation circuit 400 comprises a capacitor C, a first resistor R1, an operational amplifier OP, a second resistor R2, and a third resistor R3. A first electrode plate of the capacitor C is connected to the compensation signal line BC. One end of the first resistor R1 is connected to a second electrode plate of the capacitor C. An inverting input terminal of the operational amplifier OP is connected to another end of the first resistor R1, and an output terminal of the operational amplifier OP is connected to the touch chip 300. One end of the second resistor R2 is connected to the sensing signal line RX. Another end of the second resistor R2 is connected to a non-inverting input terminal of the operational amplifier OP. One end of the third resistor R3 is connected to the inverting input terminal of the operational amplifier OP and another end of the first resistor R1, and another end of the third resistor R3 is connected to the output terminal of the operational amplifier OP. In the operational amplifier OP shown in FIG. 4, a port marked with "+" is the non-inverting input terminal, and a port marked with "−" is the inverting input terminal. The first resistor R1 and the second resistor R2 are fixed value resistors, and the third resistor R3 is an adjustable resistor, wherein the adjustable resistor can adjust a resistance value according to the needs of the compensation circuit.

Further, the compensation circuit 400 further comprises a fourth resistor R4, wherein the fourth resistor R4 is a balanced resistor disposed between the second resistor R2 and the operational amplifier OP. It is used to ensure a symmetry of the input signal of the operational amplifier OP.

Further, the compensation signal U1 comprises a reference voltage signal and a fluctuating voltage signal (for convenience of description, the reference voltage signal is represented by U11, and the fluctuating voltage signal is represented by U12). The capacitor C is used to filter out the reference voltage signal U11, and the fluctuating voltage signal U12 is transmitted to the inverting input terminal of the operational amplifier OP through the capacitor C and the first resistor R1. Specifically, the reference voltage signal is a voltage required for normal operation of the display panel. The fluctuating voltage signal is a voltage fluctuation generated by the common electrode layer affected by a data signal or a gate signal on the driving circuit layer of the display panel.

Specifically, a compensation principle of the compensation circuit 400 is as follows: the compensation signal U1 is derived from the common electrode layer 10, and the compensation signal U1 includes a reference voltage signal U11 and a fluctuating voltage signal U12. The reference voltage signal U11 in the compensation signal U1 is filtered out by the capacitor C, so as to leave the fluctuating voltage signal U12. Then, the fluctuating voltage signal U12 and the sensing signal U2 are connected to the inverting input terminal and the non-inverting input terminal of the operational amplifier OP through the first resistor R1 and the second resistor R2. Finally, the output signal of the operational amplifier OP as the compensated sensing signal U3 is input into the touch chip 300 for processing. According to a calculation formula $U3=U2*(R3/R2)-U12*(R3/R1)$, the input sensing signal U2 can be proportionally calculated by adjusting a resistance of the third resistor R3 to change a ratio of the third resistor R3 to the second resistor R2. Simultaneously, a ratio of the third resistor R3 to the first resistor R1 is changed, such that the voltage fluctuation signal U12 can be proportionally calculated. In this way, a part of the sensing signal interfered by the voltage fluctuation signal of the common electrode layer can be effectively filtered out, a real touch signal is retained, an anti-interference ability of the touch screen is improved, and thus a signal-to-noise ratio of the touch screen is improved.

Figure 5:
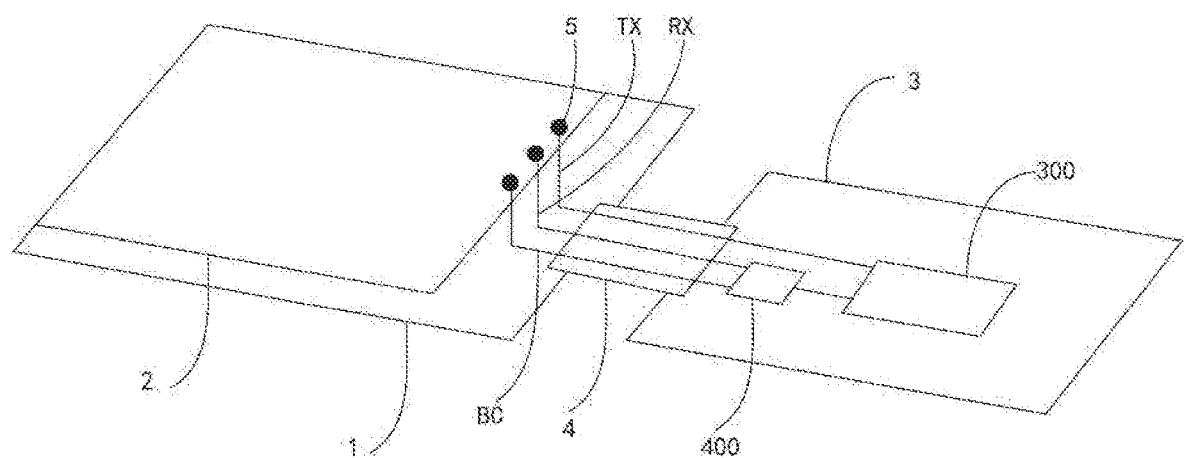
FIG. 5 is a first schematic diagram of a setting position of a compensation circuit provided by an embodiment of the present application.

Further, as shown in FIG. 5, the display panel further comprises: a first substrate 1; a second substrate 2 disposed opposite to the first substrate 1; and a printed circuit board 3 electrically connected to the first substrate 1, wherein the touch chip 300 is disposed on the printed circuit board 3, and wherein the common electrode layer and the touch layer are both disposed on the second substrate 2 (FIG. 5 does not show the common electrode layer and the touch layer). The printed circuit board 3 is connected to the first substrate 1 through a chip-on-film (COF) 4.

Further, the compensation circuit 400 is disposed on the printed circuit board 3 and located in a peripheral circuit of the touch chip 300.

Further, a plurality of gold balls 5 are also disposed on the second substrate 2, and the compensation signal line BC and the sensing signal line RX: are electrically connected respectively to the common electrode layer and the touch layer through the plurality of gold balls 5; extend to a wiring region of the first substrate 1, respectively; and connect to the compensation circuit 400 through the chip-on-film 4. The plurality of gold balls 5 are used to extract the compensation signal from the common electrode layer and to extract the sensing signal from the touch layer.

Specifically, the compensation signal is extracted from the common electrode layer through the gold ball 5, is transmitted to a wiring region of the first substrate 1 through the compensation signal line BC, and is transmitted to the compensation circuit 400 through the chip-on-film 4. The sensing signal is extracted from the touch layer through the gold ball 5, is transmitted to the wiring region of the first substrate 1 through the sensing signal line RX, and is transmitted to the compensation circuit 400 through the chip-on-film 4. The driving signal line TX transmits the driving signal sent by the touch chip to the touch layer through the gold ball 5, the driving signal line TX is led out from the touch layer to the wiring region of the first substrate 1, and the driving signal line TX is connected to the touch chip 300 through the chip-on-film 4. It is noted that, since both the common electrode layer and the touch layer are disposed on the second substrate 2, each signal line (compensation signal line BC, etc.) shown in FIG. 5 is led out from the second substrate 2.

Specifically, the first substrate is an array substrate, and the second substrate is a color filter substrate.

Figure 6:
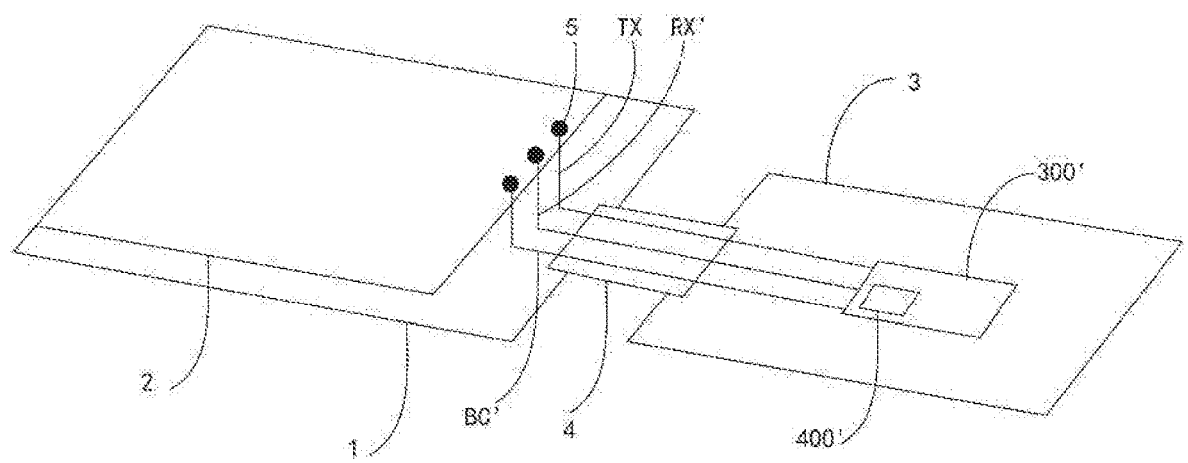
FIG. 6 is a second schematic diagram of a setting position of a compensation circuit provided by an embodiment of the present application.

In an embodiment, different from the above embodiment, the compensation circuit is integrated on the touch chip, as shown in FIG. 6. The compensation circuit 400' is integrated on the touch chip 300', and the compensation signal line BC' and the sensing signal line RX' led out from the second substrate 2 are respectively connected to the wiring region of the first substrate 1 and are connected to the touch chip 300' through the chip-on-film 4. An internal circuit on the touch chip 300' communicates with the compensation circuit 400'. For other descriptions, please refer to the above embodiments, which is not described herein again.

In an embodiment, an anti-interference method of a touch display is provided, as shown in FIG. 3. The touch display 1000 comprises: a display panel 100; a touch panel 200 disposed on the display panel 100; a touch chip 300; and a compensation circuit 400, wherein the display panel 100 comprises a common electrode layer 10; the touch panel 200 comprises a touch layer 20 disposed above the common electrode layer 10, and the touch layer 20 is electrically connected to the touch chip 200; and the compensation circuit 400 comprises an input terminal and an output terminal. At least one compensation signal line BC is led out from the common electrode layer 10, wherein the compensation signal line BC is connected to the input terminal of the compensation circuit 400 to provide a compensation signal to the compensation circuit 400. At least one sensing signal line RX is led out from the touch layer 20, and the sensing signal line RX is connected to another input terminal of the compensation circuit 400 to provide a sensing signal to the compensation circuit 400. By the compensation circuit, a compensated sensing signal is output to the touch chip 300 through the output terminal.

Specifically, as shown in FIG. 4, the compensation circuit 400 comprises a capacitor C, a first resistor R1, an operational amplifier OP, a second resistor R2, and a third resistor R3. A first electrode plate of the capacitor C is connected to the compensation signal line BC. One end of the first resistor R1 is connected to a second electrode plate of the capacitor C. An inverting input terminal of the operational amplifier OP is connected to another end of the first resistor R1, and an output terminal of the operational amplifier OP is connected to the touch chip 300. One end of the second resistor R2 is connected to the sensing signal line RX. Another end of the second resistor R2 is connected to a non-inverting input terminal of the operational amplifier OP. One end of the third resistor R3 is connected to the inverting input terminal of the operational amplifier OP and another end of the first resistor R1, and another end of the third resistor R3 is connected to the output terminal of the operational amplifier OP. The first resistor R1 and the second resistor R2 are fixed value resistors, and the third resistor R3 is an adjustable resistor, wherein the adjustable resistor can adjust a resistance value according to the needs of the compensation circuit.

Further, the compensation circuit 400 further comprises a fourth resistor R4, wherein the fourth resistor R4 is a balanced resistor disposed between the second resistor R2 and the operational amplifier OP.

Further, the compensation circuit is disposed in a peripheral circuit of the touch chip or integrated on the touch chip.

According to the above embodiment, it is known that:

The present application provides a touch display and an anti-interference method thereof. A touch display panel comprises a display panel; a touch panel disposed on the display panel; a touch chip; and a compensation circuit, wherein: the display panel comprises a common electrode layer, and the common electrode layer leads to at least one compensation signal line. The touch panel comprises a touch layer disposed above the common electrode layer, and the touch layer leads to at least one sensing signal line. The touch chip is electrically connected to the touch layer. The compensation circuit comprises an input terminal and an output terminal, wherein the input terminal is connected to the compensation signal line and the sensing signal line, and the output terminal is connected to the touch chip. The compensation circuit is used to output the compensated sensing signal to the touch chip. The compensation circuit can be provided in a peripheral circuit of the touch chip or integrated on the touch chip. The compensation circuit can effectively filter out the part of the sensing signal that is interfered by the fluctuation voltage signal of the common electrode layer, retain the real touch sensing signal, and output the compensated sensing signal to the touch chip. The problem that the existing in-cell touch screen is seriously interfered with by noise is solved, and the anti-interference ability of the touch screen is improved, thereby improving the signal-to-noise ratio of the touch screen.

In summary, although this application has been disclosed as above with preferred embodiments, the above preferred embodiments are not intended to limit this application. Those of ordinary skill in the art can make various changes and modifications without departing from the spirit and scope of this application. Therefore, the protection scope of the present application is subject to the scope defined by the claims.

The invention claimed is:

1. A touch display, comprising:
 a display panel;
 a touch panel disposed on the display panel;
 a touch chip; and
 a compensation circuit, wherein the display panel comprises a common electrode layer, and at least one compensation signal line is connected to the common electrode layer;
 the touch panel comprises a touch layer disposed above the common electrode layer, and at least one sensing signal line is connected to the touch layer;
 the touch chip is electrically connected to the touch layer;
 the compensation circuit comprises an input terminal, an output terminal, a capacitor, a first resistor, an operational amplifier, a second resistor, and a third resistor, wherein the input terminal is connected to the compensation signal line and the sensing signal line, the output terminal is connected to the touch chip, a first electrode plate of the capacitor is connected to the compensation signal line, one end of the first resistor is connected to a second electrode plate of the capacitor, an inverting input terminal of the operational amplifier is connected to another end of the first resistor, an output terminal of the operational amplifier is connected to the touch chip, one end of the second resistor is connected to the sensing signal line, and another end of the second resistor is connected to a non-inverting input terminal of the operational amplifier, one end of the third resistor is connected to the inverting input terminal of the operational amplifier and the another end of the first resistor, another end of the third resistor is connected to the output terminal of the operational amplifier, the first resistor and the second resistor are fixed value resistors, and the third resistor is an adjustable resistor; and the compensation signal line is configured to provide a compensation signal to the compensation circuit, the sensing signal line is configured to provide a sensing signal to the compensation circuit, and the compensation circuit is configured to output a compensated sensing signal to the touch chip.

2. The touch display according to claim 1, wherein the compensation circuit further comprises a fourth resistor, and wherein the fourth resistor is a balanced resistor disposed between the second resistor and the operational amplifier.

3. The touch display according to claim 1, wherein the compensation signal comprises a reference voltage signal and a fluctuating voltage signal, and the capacitor is configured to filter out the reference voltage signal.

4. The touch display according to claim 3, wherein the display panel further comprises: a first substrate, a second substrate disposed opposite to the first substrate, and a printed circuit board electrically connected to the first substrate, wherein the touch chip is disposed on the printed circuit board, and wherein the common electrode layer and the touch layer are both disposed on the second substrate.

5. The touch display according to claim 4, wherein the printed circuit board is connected to the first substrate through a chip-on-film.

6. The touch display according to claim 4, wherein the compensation circuit is disposed on the printed circuit board and located in a peripheral circuit of the touch chip.

7. The touch display according to claim 6, further comprising a plurality of gold balls disposed on the second substrate, wherein the compensation signal line and the sensing signal line are electrically connected respectively to the common electrode layer and the touch layer through the plurality of gold balls, extend to a wiring region of the first substrate respectively, and connected to the compensation circuit through a chip-on-film.

8. The touch display according to claim 4, wherein the compensation circuit is integrated in the touch chip.

9. The touch display according to claim 8, further comprising a plurality of gold balls disposed on the second substrate, wherein the compensation signal line and the sensing signal line are electrically connected respectively to the common electrode layer and the touch layer through the plurality of gold balls, extend to a wiring region of the first substrate respectively, and connected to the touch chip through a chip-on-film.

10. An anti-interference method of a touch display, wherein the touch display comprises: a display panel, a touch panel disposed on the display panel, a touch chip, and a compensation circuit, the display panel comprises a common electrode layer, the touch panel comprises a touch layer disposed above the common electrode layer, the touch layer is electrically connected to the touch chip, the compensation circuit comprises an input terminal, an output terminal, a capacitor, a first resistor, an operational amplifier, a second resistor, and a third resistor, a first electrode plate of the capacitor is connected to a compensation signal line, one end of the first resistor is connected to a second electrode plate of the capacitor, an inverting input terminal of the operational amplifier is connected to another end of the first resistor, an output terminal of the operational amplifier is connected to the touch chip, one end of the second resistor is connected to a sensing signal line, another end of the second resistor is connected to a non-inverting input terminal of the operational amplifier, one end of the third resistor is connected to the inverting input terminal of the operational amplifier and the another end of the first resistor, another end of the third resistor is connected to the output terminal of the operational amplifier, the first resistor and the second resistor are fixed value resistors, the third resistor is an adjustable resistor, the compensation signal line is extended from the common electrode layer and connected to the input terminal of the compensation circuit, the sensing signal line is extended from the touch layer and connected to another input terminal of the compensation circuit and the anti-interference method of the touch display comprises:

providing a compensation signal through the compensation signal line to the compensation circuit;

providing a sensing signal through the sensing signal line to the compensation circuit; and outputting, by the compensation circuit, a compensated sensing signal to the touch chip through the output terminal of the compensation circuit.

11. The anti-interference method of the touch display according to claim 10, wherein the compensation circuit further comprises a fourth resistor, and wherein the fourth resistor is a balanced resistor disposed between the second resistor and the operational amplifier.

12. The anti-interference method of the touch display according to claim 10, wherein the compensation signal comprises a reference voltage signal and a fluctuating voltage signal, and the capacitor is configured to filter out the reference voltage signal.

13. The anti-interference method of the touch display according to claim 12, wherein the display panel further comprises: a first substrate, a second substrate disposed opposite to the first substrate, and a printed circuit board electrically connected to the first substrate, wherein the touch chip is disposed on the printed circuit board, and wherein the common electrode layer and the touch layer are both disposed on the second substrate.

14. The anti-interference method of the touch display according to claim 13, wherein the printed circuit board is connected to the first substrate through a chip-on-film.

15. The anti-interference method of the touch display according to claim 13, wherein the compensation circuit is disposed on the printed circuit board and located in a peripheral circuit of the touch chip.

16. The anti-interference method of the touch display according to claim 15, wherein the touch display further comprises a plurality of gold balls disposed on the second substrate, and the compensation signal line and the sensing signal line are electrically connected respectively to the common electrode layer and the touch layer through the plurality of gold balls, extend to a wiring region of the first substrate respectively, and connected to the compensation circuit through a chip-on-film.

17. The anti-interference method of the touch display according to claim 13, wherein the compensation circuit is integrated in the touch chip.

18. The anti-interference method of the touch display according to claim 17, wherein the touch display further comprises a plurality of gold balls disposed on the second substrate, and the compensation signal line and the sensing signal line are electrically connected respectively to the common electrode layer and the touch layer through the plurality of gold balls, extend to a wiring region of the first substrate, respectively, and connect to the touch chip through a chip-on-film.

* * * * *